United States Patent
Yaffe

(10) Patent No.: US 9,754,030 B2
(45) Date of Patent: Sep. 5, 2017

(54) FREE TEXT SEARCH ENGINE SYSTEM AND METHOD

(71) Applicant: Software AG, Darmstadt (DE)

(72) Inventor: Lior Yaffe, Hadera (IL)

(73) Assignee: Software AG, Darmstadt (DE)

(*) Notice: Subject to any disclaimer, the term of this patent is extended or adjusted under 35 U.S.C. 154(b) by 829 days.

(21) Appl. No.: 14/230,673

(22) Filed: Mar. 31, 2014

(65) Prior Publication Data
US 2015/0278356 A1    Oct. 1, 2015

(51) Int. Cl.
*G06F 17/30*    (2006.01)
*G06F 7/00*    (2006.01)

(52) U.S. Cl.
CPC .. *G06F 17/30864* (2013.01); *G06F 17/30312* (2013.01)

(58) Field of Classification Search
CPC ............ G06F 17/30864; G06F 17/30312
USPC ........................................... 707/711
See application file for complete search history.

(56) References Cited

U.S. PATENT DOCUMENTS

| | | | |
|---|---|---|---|
| 6,816,880 B1 * | 11/2004 | Strandberg ............ | G06F 9/4443 709/202 |
| 8,428,931 B2 | 4/2013 | Yaffe | |
| 2009/0234811 A1 * | 9/2009 | Jamil ................ | G06F 17/30867 |
| 2014/0149558 A1 * | 5/2014 | Quan .................. | H04L 65/4084 709/219 |

* cited by examiner

*Primary Examiner* — Kuen Lu
(74) *Attorney, Agent, or Firm* — Posz Law Group, PLC

(57) ABSTRACT

A free text search engine system, for an application, aggregates information sent to and received from a host by the emulator running the application. The information includes (i) field names and associated field contents for a display screen for the application, (ii) emulator action indicating sent or received, (iii) a screen image of the display screen used when the information was sent or received, and (iv) a hot link to reproduce the display screen. The system indexes field contents and field names in memory and searches, in response to receipt of a search query specifying a search term, the field contents and the field names in the memory that match the search term to form search results. The search results are ranked using a rank calculation based on various ranking factors.

19 Claims, 3 Drawing Sheets

```
--------------------------------------------------------------------------------
1/20/14                        Music Box Factory                     MBF006
11:46:53                        Update Customer                      User: LYAF Customer #:       00231451
     First Name:       Barney
     Middle Initial:
     Last Name:        Rubble Address1:  101 Stone age Drive
     Address2:
     City       Rockville             State: MD   Zip: 12345
     Phone:          1234567     Ext:
     Fax:           7-7000000
     E-Mail:    barney@softwareag.com Customer Type: P    (P=Private, B=Business)
            Active:        Y    (Y/N)
            Preferred?:    N    (Y=Yes, N=No)
            % Discount:    10   (10,20,30)

F3=Exit F4=Prompt F12=Cancel        F18=Print
--------------------------------------------------------------------------------
```

FREE TEXT SEARCH ENGINE SYSTEM AND METHOD

TECHNICAL FIELD

The technical field relates in general to searching and indexing data retrieved from a mainframe system.

BACKGROUND

Legacy applications provide access to data using structured and defined interfaces designed by application developers using a pre-programmed sequence of application specific screens and reports. As a result, the application data can be efficiently searched only in ways that were anticipated by the application developers, which is usually based only on specific key fields.

In many cases there is a need to access data in ways which were not anticipated by the application developer. As a result, finding the data is a slow and time consuming process for the user due to the lack of necessary search interfaces. In addition, accessing the data can require heavy processing from the underlying mainframe database since it may require sequential database queries.

While multiple products and extensive technology exists in the area of searching and indexing mainframe databases, the traditional technology is focused on providing pointers to a specific database record or field based on a free text search term. Yet, these products do not provide the context of how the data was introduced to the mainframe.

Moreover, the traditional technology is merely focused on searching text, XML and HTML data stored inside the mainframe database.

One or more embodiments discussed herein can address the aforementioned problems, by providing quick data retrieval capabilities based on unstructured search queries. The free text search engine system can have an ability, based on a search term, to provide pointers into the actual application screens used for creating, reading, updating and deleting a certain value or keyword. The free text search engine system also can provide search capabilities of information such as customer, order or item identifiers and numeric information such as transaction amounts. For each search term the results data can present the transactions of the data and not just its current state.

SUMMARY

Accordingly, one or more embodiments provide a method, system and/or non-transitory computer readable medium for free text-searching applications, such as legacy applications.

Accordingly, an embodiment provides a free text search engine method for an application comprising aggregating, by a processor, information sent to and received from a host by an emulator running the application. The information includes (i) field names and associated field contents for a display screen for the application, (ii) emulator action indicating sent or received, (iii) a screen image of the display screen used when the information was sent or received, and (iv) a hot link to the display screen. The method also comprises indexing, by the processor, field contents and the field names in a memory; searching, by the processor, responsive to receipt of a search query specifying a search term, the field contents and the field names in the memory that match the search term to form search results; and returning, by the processor, the search results by providing the screen image of the display screen used when the information matching the search term was sent or received and/or the hot link to navigate to a live copy of the display screen with the information that matches the search term.

According to another embodiment, the method further comprises receiving, by a processor, notification that the emulator running the application has either received data from the host or sent data to the host for the display screen for the application.

According to yet another embodiment, the method further comprises navigating, by the processor, to the screen image which corresponds to the search results.

According to another embodiment, the method further comprises filtering, by the processor, the search results.

According to another embodiment, the method further comprises ranking using a rank calculation based on one or more of a plurality of ranking factors including type of search word, location of the search word on a screen, number of times the search word is detected, and timing of when the screen linked to the search word was indexed.

According to another embodiment, the method further comprises aggregating that occurs when the emulator receives a screen from the host and when the emulator sends data to the host.

According to another embodiment, the aggregating occurs by intercepting and parsing screen based communication protocols.

According to another embodiment, the field names assigned in the aggregating step belong to at least one of three categories: (i) Keyword, (ii) Screen, and (iii) EmulatorAction According to another embodiment, the filtering of the search results is based on session identifiers, screen names, and field properties so as to provide role-based access to search results.

An embodiment provides a free text search engine system for an application that comprises a processor configured to aggregate information sent to and received from a host by an emulator running the application. The information including (i) field names and associated field contents for a display screen for the application, (ii) emulator action indicating sent or received, (iii) a screen image of the display screen used when the information was sent or received, and (iv) a hot link to the display screen. The processor is also configured to index field contents and the field names in a memory; search responsive to receipt of a search query specifying a search term, the field contents and the field names in the memory that match the search term to form search results; and return the search results by providing the screen image of the display screen used when the information matching the search term was sent or received and/or the hot link to navigate to a live copy of the display screen with the information that matches the search term.

According to another embodiment, the processor is further configured to receive notification that the emulator running the application has either received data from the host or sent data to the host for the display screen for the application.

According to yet another embodiment, the processor is further configured to navigate to the screen image which corresponds to the search results.

According to another embodiment, the processor is further configured to filter the search results.

According to still another embodiment, the processor is further configured to rank using a rank calculation based on one of a plurality of ranking factors including type of search word, location of the search word on a screen, number of times the search word is detected, and timing of when the screen linked to the search word was indexed.

According to another embodiment, aggregating occurs when the emulator receives a screen from the host and when the emulator sends data to the host.

According to another embodiment, aggregating occurs by intercepting and parsing screen based communication protocols.

According to yet another embodiment, the field names assigned when the processor performs the aggregation belong to at least one of three categories: (i) Keyword, (ii) Screen, and (iii) EmulatorAction.

According to still another embodiment, the filtering of the search results is based on session identifiers, screen names, and field properties so as to provide role-based access to search results.

Yet another embodiment provides a non-transitory computer readable medium, which can perform a method according to one or more of these embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 3 is an example of a screen image that is displayed in response to a <screen image> link.

DETAILED DESCRIPTION

Figure 1:
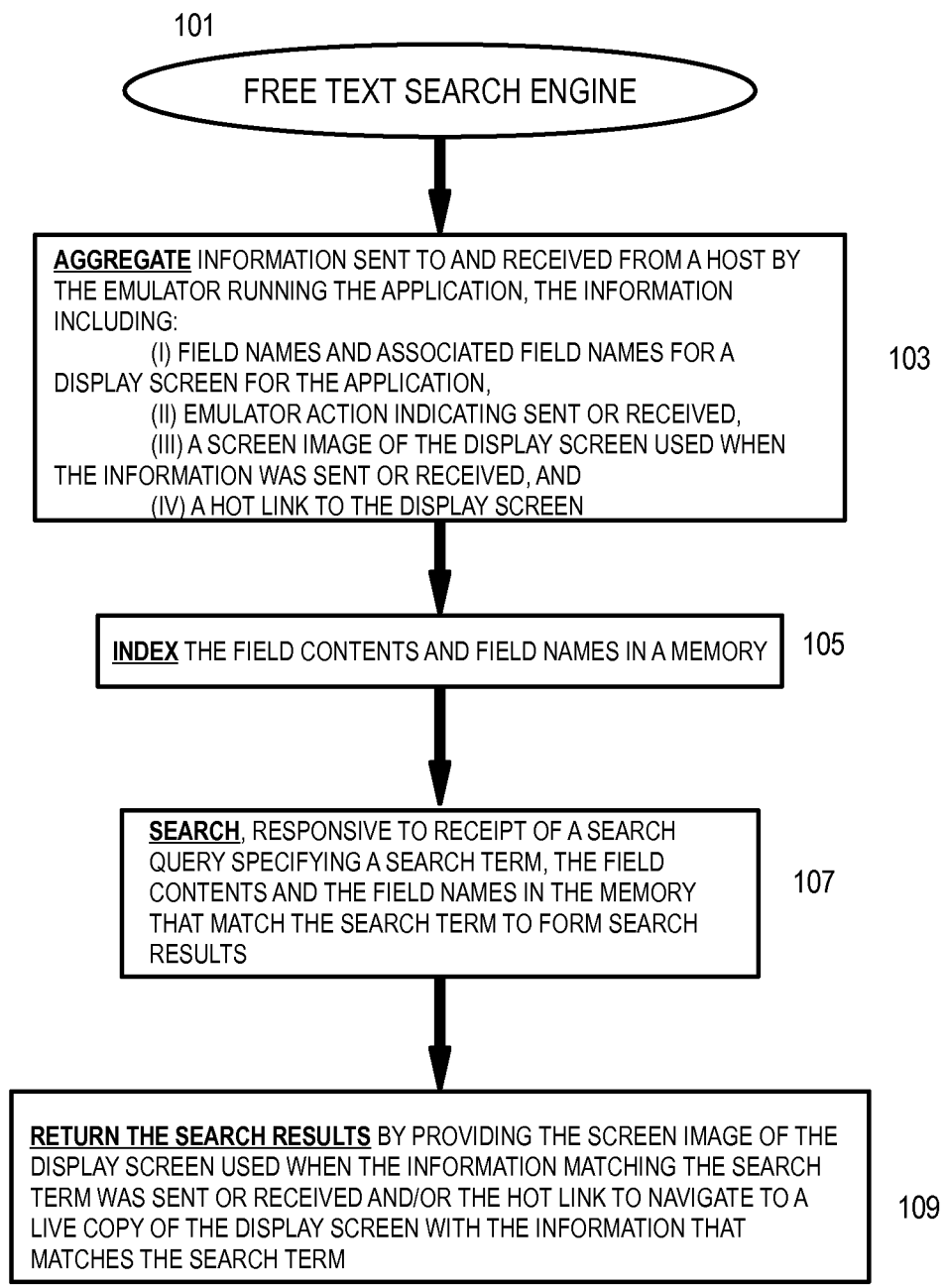
FIG. 1 is a flowchart of the process for the free text search engine.

In overview, the present disclosure provides search capabilities into the application itself rather than a simple database search.

The system can return an extensive array of types of search results that include, for example, representation(s) of the application screen that had been used for creating, reading, updating or deleting the searched data; metadata about when the data was used, by whom, and how the screen was used for working with the data reached by the user; intermediate calculated values which are not stored in the database; and/or cached view(s) of deleted data; and the like. This goes beyond a conventional screen scraping process that collects character-based data from a display of another program, by storing and using the data in relation to the actual display screens and the manner in which the data was used, accessible via searching.

In addition, the search results dialog can include hot links which can be used to open an application session and navigate the application to the live copy of the data in a manner similar to the manner in which clicking a search result in a web search navigates the browser to the page containing the data. Search results can be aggregated over time so that historical data, which may include data which was already deleted from the database, can be viewed; some part of this concept may superficially be reminiscent of the WayBackMachine (http://web.archive.org).

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

The term "hot link" is used herein to denote a direct link in an HTML file to a file on another server. In an embodiment, a "hot link" more specifically can be a "synchronization path" which can be stored for later retrieval and then used to navigate an application run by an emulator to a cached screen which is synchronized with emulator actions used to arrive at the screen which existed when cached. In an embodiment, the "hot link" is the "synchronization path" as provided in U.S. Pat. No. 8,428,931 to Yaffe (the content of which is expressly incorporated herein).

The term "identified screen" is used herein to denote a screen captured by the webMethods ApplinX development tool, identified using the specified identifiers and separated into Input, Output fields and static text. An identified screen has a unique identifier and better separation into logical fields.

The term "unidentified screen" is used herein to denote an arbitrary screen not recognizable by the webMethods ApplinX development tool. Such screen has no unique identifier, no separation between output fields and static text and data is only identified by position on the host screen.

The term "session identifiers" is used herein to denote unique identifiers shared by all screens accessed from a specific session. Typical identifiers are one or more of: Username, Device name, host address; other identifiers will be appreciated by one of skill in the art.

The term "presentation space" is used herein to denote a well-known concept of a host emulator representing single pieces of data as well as their presentation properties.

<End of Definitions>

The main components of the free text search engine can include an aggregator, a cache, a searcher, a display, a mainframe link, and a filter. The aggregator harvests information from host screens by intercepting and parsing screen based communication protocols such as 3270, 5250 and VT using a host emulation component, for example, the webMethods ApplinX host emulation component. The cache maintains and indexes the information distributed in memory cache, for example, using an indexing tool, for example, based on Terracotta. The searcher can provide search capabilities, for example state of the art search capabilities, for example using the Apache Solr search platform. The displays can provide a "web like" search result web page displaying the corresponding mainframe screen image, metadata, and/or a "mainframe link" to the actual screen. The mainframe link navigates the mainframe session to the mainframe screen displaying the search result data. The filter restricts search results based on session identifiers, screen names, and field properties to provide role-based access to the searchable index.

The aggregator component can be, for example, an extension of the webMethods ApplinX emulator. The aggregator listens to emulator events and collects data when one of the following events is fired: (i) onReceive( )—when the emulator receives a screen from the host; and (ii) onSend( )—when the emulator sends data to the host.

The event context of an onReceive( ) event contains at least the following information: (i) screen image, compressed serialized Java object representing the current host screen; and (ii) PS item, an unordered list of "Presentation Space" items representing the dynamic data of the screen, for example, the data populating input and output fields without the screen structure elements such as static text.

The onSend( ) event is always fired after a corresponding onReceive( ) event. The onSend( ) represents the data updated by the emulator into the mainframe screen received by the previous onReceive( ) event.

The event context of an onSend( ) event contains at least the following information: (i) screen image, serialized Java object representing the current host screen as saved by the corresponding onReceive( ) event; and (ii) emulator data, an unordered list of information typed by the emulator into fields on the host screen.

Objects such as PS items and emulator data are generally treated the same way by the aggregator except for a "type" field which is set to "received" for PS items and "Sent" for user data. In the context of the free text search engine, these types of objects are referred to as "field data". Field data represents a sequence of "Keyword" objects which consist of alphanumeric data, separated by ignorable tokens such as blanks, delimiters and attributes.

The aggregator can define the following data types:

Keyword—each keyword object can be represented using the following type:

| Field Name | Data Types | Description |
|---|---|---|
| Text | String | The keyword text |
| Type | Integer | "Received" or "Sent" data based on the event type |
| Position on screen | Integer | Position of the keyword on the host screen as offset from the top left |
| Containing field | String | Name of the containing field (N/A for unidentified screens) |
| Number of keywords in field | Integer | The number of keywords extracted from the same field |
| Screen reference | Screen | Reference to the screen object from which this keyword was extracted |
| Rank | Integer | Calculated value, the higher the rank the higher the importance of the keyword |

Screen—each screen object can be represented using the following type:

| Field Name | Data Type | Description |
|---|---|---|
| Object | Binary array | Implementation specific, serialized object representing the current host screen |
| Screen name | String | Name of the screen (N/A for unidentified screens) |
| Session identifiers | List of Strings | Session identifiers of the current session such as mainframe username and device name |
| Time | Long | Time stamp of the time when the screen was indexed |
| Emulator Action | Emulator Action | Reference to the Emulator Action performed by the emulator in order to reach this screen. Null for the first screen of the session |

EmulatorAction—each action sent by the emulator can be represented using the following type:

| Field Name | Data Type | Description |
|---|---|---|
| Fields Data | List of (Integer, String) tuples | Representing position and text of the data sent by the emulator to the host |
| Cursor Position | Integer | Position of the cursor on the emulator screen |
| Screen reference | Screen | Reference to the screen object on which this data is typed |

Upon receiving an onReceive( ) event from the emulator the aggregator can perform an algorithm such as represented by the following pseudo-code:

```
Create Screen object with a reference to the "Last Emulator Action"
variable
Set the "Current Screen" variable to this Screen object
For each field data in the screen {
    Tokenize field data into keywords
    For each keyword {
        Create a Keyword object with type "Received" and add it to
the Keywords list
```

```
    Add a reference from the Keyword to the Screen object
  }
}
Call addScreen( ) to Store the Screen object and Keywords List in the
search index
```

Upon receiving an onSend( ) event from the emulator the aggregator can perform an algorithm such as represented by the following pseudo-code:

```
Create an Emulator Action object with a reference to the "Current Screen"
variable
Set the "Last Emulator Action" variable to this emulator action
For each field data in the emulator action {
    Tokenize field data into keywords
    For each keyword {
        Create a Keyword object with type "Sent" and add it to the
        keywords list
        Add a reference from the Keyword to the "Current Screen"
        object
    }
}
Call addEmulatorAction( ) to add the Emulator Action object and the
Keywords List to the search index
```

The search index can be implemented as an in-memory cache composed of several data structures, including a map of keywords-to-objects (sometimes referred to herein as "KeywordsMap"), screens, and emulator actions. The KeywordsMap is a hash table that includes, for example, a key (string object representing a keyword text) and a value (list of keyword objects). The screens data structure represents a set of screen objects. The emulator actions data structure represents a set of emulator action objects.

Adding information to the search index can performed using one of the following APIs:

```
addScreen( ) - adds a Screen object and its Keywords List to the cache:
Add the Screen object to the Screens list.
Add the Keywords in the list using the addKeywords( ) API.
addEmulatorAction( ) - adds Emulator Action and its Keywords List to the
cache:
Add the Emulator Action to the Emulator actions list.
Add the Keywords in the list using the addKeywords( ) API.
addKeywords( ) - adds keywords to the KeywordsMap:
For each Keyword object in Keywords list {
    If Keyword does not exist in the KeywordsMap hash table {
        Add a new entry to KeywordsMap with:
Key represented by the Text of the Keyword
Value represented by a new list of Keyword objects containing a single
element, the Keyword object itself
Continue
    }
Get the existing Keyword list for the current Keyword Text and add the
new Keyword object to the list
}
```

Searching the index can be performed using the search( ) API. The search( ) API can receive a keyword string as parameter and return a list of matching keyword objects, for example, all matching keyword objects or top matching keyword objects, for example sorted such as by rank, or null in case the keyword was not found. The keyword algorithm can be along the lines of the following pseudo-code:

```
Given a String to search, lookup the keyword text in the KeywordsMap
hash table.
```

```
If not found return null
For each Keyword in the Keyword List {
    If Rank not set:
Calculate keyword rank and store the rank in the Keyword object
}
Sort the Keyword List by Rank
Return the sorted Keyword List
```

Rank calculation can be based on one or more of several criteria including, by way of example:

Type of Keyword (Sent/Received). Sent keyword may be more relevant since it was updated by the user and not just retrieved from the host.

Location on screen—For screens composed of, for example, Latin Left To Right text, Keywords based on location to the left and top of the screen receive higher rank while for Hebrew RTL screens location to the right and top receive higher rank.

Number of keywords in field—the lower the number of keywords extracted from the field the higher the rank Time of indexing—the later the time in which the screen linked to the keyword was indexed the higher the rank Ranking factors can be combined into a single rank, for example with a value between 0 and 1, for example using Fuzzy sets and/or center of gravity Defuzzification. The importance of each of the ranking factors can be manually configured for optimal results on a per application basis.

An example of a search page format is as follows:

```
Search for mainframe screens with:

(1.1) All these words _____
(1.2) Any of these words _____
(1.3) None of these words _____
(1.4) Numbers ranging from _____ to _____
Filter your results by:

(2.1) Last access time from _____ to _____
(2.2) Screen name _____
(2.3) Field name _____
(2.4) Position on screen _____
(2.5) Session identifiers _____
<Search button>
```

The results page can provide a list of rows, which may be sorted for example by rank. Each row can contain one or a combination of one or more of the following information:

Field data—the complete text of the field from which the keyword was extracted

Action Type—receive or send

Date—time of indexing

Link to screen image—hyperlink, clicking on the link displays the actual screen image from which the keyword was indexed with the keyword text marked with a Red rectangle.

Navigation—diagram which displays the path from a known anchor screen to the specific screen displaying the data.

The search operation can be implemented as a separate component, for example by a 3rd party component. The search operation can receive as input a list of search term(s) and a list of filter(s) and can provide as a result a list of entries that match the search criteria, for example from the KeywordsMap. The search subroutine itself can call back to the product rank( ) function in order to rank the search results providing the Keyword object as a parameter. It then can return a list, which may be sorted by rank, of the keyword objects.

Given a Keyword object the rank operation can generate a rank value based on a membership function of a fuzzy set created from the ranking criteria. The result page can be rendered based on the list of keywords returned from the search operation. Given a Keyword object, the product can load the referenced screen image, can de-serialize it to an object, and (optionally) can create a human readable representation. Additionally, in some embodiments it can highlight the searched keyword, for example, it can paint markings around the appearances of the searched keyword inside the screen image.

The navigation can be generated by following the references from the keyword object to its referenced screen image, then to the referenced emulator action, and then to its referenced screen image and so on until reaching one of the following conditions: (1) the emulator action of the screen image is null—i.e. we reached the first screen of the session; or (2) we reached one of the designated anchor screens—these can be well known screens such as the application main menu, and/or can be previously designated, for example by the application, as an anchor screen.

The list of screens and their pointed emulator actions can then be rendered, for example using a breadcrumb layout using known techniques. Clicking on any of the breadcrumb nodes can bring up the screen image for screen nodes and/or the specific data for an emulator action node.

Clicking the execute button can launch a transaction on the ApplinX server passing the navigation list as parameter. The product then can follow the navigation list while connected to a live mainframe session until reaching the screen containing the search keyword. Once reached, this screen can be presented to the user as an interactive mainframe screen allowing the user to take control of the session and work with data.

In a case when the navigation provided is no longer operational, such as when a data record of the specific screen containing the search keyword no longer exists, the product can present the last reachable screen and/or display an appropriate error message.

Referring now to FIG. 1, a flowchart of the process 101 for the free text search engine system will be discussed and described. The process 101 aggregates 103 information sent to and received from a host by an emulator running the application, the information including (i) field names and associated field contents for a display screen for the application, (ii) emulator action indicating sent or received, (iii) a screen image of the display screen used when the information was sent or received, and (iv) a hot link to the display screen. The process 101 indexes 105 field contents (sometimes referred to herein as "field data") and the field names in memory. The process 101 searches 107 responsive to receipt of a search query specifying a search term, the field contents and the field names in the memory that match the search term to form search results. The process 101 returns 109 the search results by providing the screen image of the display screen used when the information matching the search term was sent or received and/or the hot link to navigate to a live copy of the display screen with the information that matches the search term.

Figure 2:
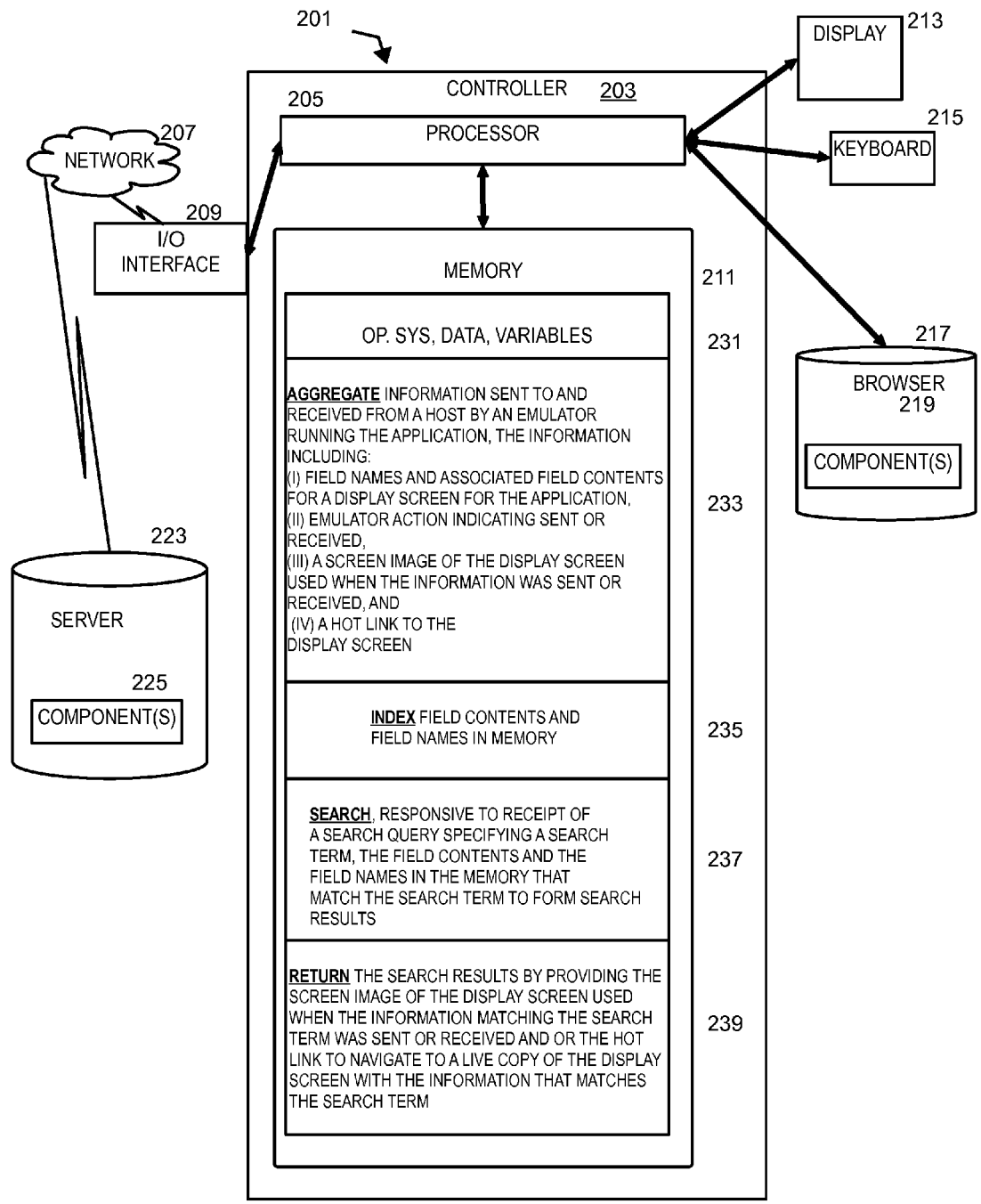
FIG. 2 is a block diagram that depicts relevant portions of a computer system.

Referring now to FIG. 2, a block diagram illustrating relevant portions of a computer system 201 will be discussed and described. The computer system 201 may include one or more controllers 203, a processor 205, an input/output (i/o) interface 209 for communication such as with a network 207, a memory 211, a display 213 (optional), and/or a user input device such as a keyboard 215. Alternatively, or in addition to the keyboard 215, a user input device may comprise one or more of various known input devices, such as a keypad, a computer mouse, a touchpad, a touch screen, a trackball, and/or a keyboard. The display 213 may present information to the user by way of a conventional liquid crystal display (LCD) or other visual display, and/or by way of a conventional audible device (e.g., a speaker) for playing out audible messages. Portions of the computer system 201 are well understood to those of skill in this area and have been omitted to avoid obscuring the discussion.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 231 for programs executed by the processor 205; computer programs for causing the processor to operate in connection with various functions such as aggregating 233 information sent to and received from a host by an emulator running the application, the information including (i) field names and associated field contents for a display screen for the application, (ii) emulator action indicating sent or received, (iii) a screen image of the display screen used when the information was sent or received, and (iv) a hot link to the display screen; indexing 235 field contents and the field names in a memory; searching 237 responsive to receipt of a search query specifying a search term, the field contents and the field names in the memory that match the search term to form search results; and returning 239 the search results by providing the screen image of the display screen used when the information matching the search term was sent or received and/or the hot link to navigate to a live copy of the display screen with the information that matches the search term. The computer programs may be stored, for example, in ROM or PROM and may direct the processor 205 in controlling the operation of the computer system 201. Each of these functions is considered in more detail herein, to the extent that it is not detailed elsewhere in this document.

The user may invoke functions accessible through the user input device such as the keyboard 215. The user input device may comprise one or more of various known input devices, such as a keyboard (215, illustrated) and/or a pointing device, such as a mouse; the keyboard 215 may be supplemented or replaced with a scanner, card reader, or other data input device; and the pointing device may be a mouse, touch pad control device, track ball device, or any other type of pointing device.

Responsive to manual signaling from the user input device represented by the keyboard 215, in accordance with instructions stored in memory 211, and/or automatically upon receipt of certain information via the i/o interface 209, the processor 205 may direct the execution of the stored programs.

The computer system 201 may utilize a browser 217, which includes several browser component(s) 219.

The computer system 201 can access a server 223 on which is stored one or more components, here represented by server component(s) 225. Although the components 225 are illustrated as accessed over the network 207, the components 225 may be remotely and/or locally accessible from the computer system 201, over a wired and/or wireless connection; the components 225 do not need to be limited to a database or a server. Techniques are known for accessing components located in a server 223, and the like.

With regard to the server 223 and browser 217, it may be noted that the computer programs stored in the memory 211 are illustrated on the controller 203. In a client/server embodiment, one or more of the computer programs conveniently may be distributed to the server, such as those marked "SERVER", and one or more of the computer programs conveniently may be distributed to a client side, such as those marked "CLIENT". In such a situation, the server 223 may omit the client computer programs, and the client may omit the server computer programs. In another embodiment, the computer programs may be included on a non-client-server architecture, and the requests between client-server may be omitted.

The processor 205 may be programmed for aggregating 233 information sent to and received from a host by an emulator running the application, the information including (i) field names and associated field contents for a display screen for the application, (ii) emulator action indicating sent or received, (iii) a screen image of the display screen used when the information was sent or received, and (iv) a hot link to the display screen. The aggregating 233 functionality can be run on various computers in a distributed system as will be appreciated, for example, on the host that is running the emulator, on a separate computer that is monitoring communications to/from the emulator, or similar. The communications may conventionally indicate (i) field names and associated field contents for a display screen for the application and (ii) an indication of sent or received; and optionally may include (iii) the screen image. The hot link may be prepared by the aggregating 233 functionality.

The processor 205 may be programmed for indexing 235 field contents and the field names in a memory. The indexing may be performed using known techniques, for example, hashing, or for example using a known tool for indexing in connection with cache instances, such as Terracotta. It may be convenient for the processor 205 to store the indexed field contents to a memory which can be cached at the computer system 201, or to store the index to an electronic storage which is stored remotely, such as at the server 223.

The processor 205 may be programmed for searching 237 responsive to receipt of a search query specifying a search term, for the field contents and the field names in the memory that match the search term to form search results. A search query may be received by the processor 205 for example in response to user operation of a keyboard 215, or a search query received from a program (not illustrated), or the like. The index can be utilized by the searching 237 functionality to determine the search results, as explained elsewhere in this document.

The processor 205 may be programmed for returning 239 the search results by providing the screen image of the display screen which was used when the information matching the search term was sent or received and/or the hot link to navigate to a live copy of the display screen with the information that matches the search term. The search results, screen image, and/or hot link and live copy of the display screen, which is/are provided, may be reproduced for example on the display 213 using the usual techniques.

As will be understood in this field, besides the functions discussed above, the memory 211 can include other miscellaneous information in a misc. database, not shown, along with the usual temporary storage and other instructions for other programs not considered herein.

The computer system 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be performed by different components from one or more embodiments. Likewise, functions may be grouped differently, combined, or augmented without parting from the scope. For example, the aggregating 233 and indexing 235 functionalities may be conveniently distributed to a separate computer; and the searching 237 and returning search results 239 functionalities may be conveniently distributed to a different computer, and may be used at later times to retrieve previously-aggregated-and-indexed screen-related information. Similarly the present description may describe various databases or collections of data and information. One or more groupings of the data or information may be omitted, distributed, combined, or augmented, or provided locally and/or remotely without departing from the scope.

Referring now to FIG. 3, an example of a screen image that is displayed in response to a <screen image> link will be discussed and described. In an example, the user wants to find a customer with an email address that ends with the text "@softwareag.com". The search page and result page would be as follows:

---

Search page:
(1.1) All these words: softwareag.com
... rest of the fields are empty ...
Result page:
 (1) "barney@softwareag.com" , receive , 2014-01-19, <screen image>,
 (2) "berney@softwareag.com" , receive , 2014-01-18, <screen image>,
 (3) "Send email to softwareag.com please", sent, 2014-01-19, <screen image>,

---

Note that (1) and (2) may refer to different appearances of the same screen thus providing revision view showing how the data has changed over time. Entry (3) represents a different screen containing the same text.

Clicking on the <screen image> link would cause a display to reproduce the screen image page 300 illustrated in FIG. 3. Clicking on the link would display the following page which lists links in sequence that resolve to a corresponding sequence of screen images:

MainMenu →(action MainMenu) →
MBF000 → (action MBF000) →

-continued

```
MBF004 → (action MBF004)
MBF005 → (action MBF005)
MBF006 → keyword
<Execute button>
```

Clicking on a screen image node (MBF000, for example) displays the corresponding screen image. Clicking on an emulator action node ((action MBF000), for example) displays the data typed by the emulator as part of this emulator action in a position/text format and the focus position of the emulator action. Clicking the <execute button> opens an interactive mainframe session and navigates to the screen.

Accordingly, data can be extracted while a user was browsing an application, and/or can be extracted via a batch task that runs across screens/records, identifies fields (and field contents), aggregated, and the results of the aggregation can be stored in a new, possibly temporary, database, which supports various search features. The data which is stored can include a hot link (or more particularly, a "synchronization path") to quickly navigate to the then-existing screen together with the extracted data that is related to the then-existing screen. The data which is stored can be searched to return the data fields and contents, an image of the then-existing screen, and/or the hot-link to the then-existing screen which is live and can be interacted-with. This can be particularly useful to reap more out of a legacy-type applications than was originally intended, i.e., to be able to extract the information from a screen in a way that the application itself did not provide supporting structures, to associate the information from a screen with information about that specific screen, and to provide a search of that information.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the art of communications between emulators and mainframes, instead of as interpreted by a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A free text search engine method for an application comprising:
   aggregating, by a processor, information sent to and received from a host by an emulator running the application, the information including (i) field names and associated field contents for a display screen for the application, (ii) emulator action indicating sent or received, (iii) a screen image of the display screen used when the information was sent or received, and (iv) a hot link to reproduce the display screen;

indexing, by the processor, the field contents and the field names in a memory;

searching, by the processor, responsive to receipt of a search query specifying a search term, the field contents and the field names in the memory that match the search term to form search results; and returning, by the processor, the search results by providing the screen image of the display screen used when the information matching the search term was sent or received and/or the hot link to navigate to a live copy of the display screen with the information that matches the search term.

2. The method of claim 1, further comprising receiving, by a processor, notification that the emulator running the application has either received data from the host or sent data to the host for the display screen for the application, and subsequently performing the aggregating of the data.

3. The method of claim 1, further comprising navigating, by the processor, from the search results to the screen image returned in the search results.

4. The method of claim 1, further comprising filtering, by the processor, the search results.

5. The method of claim 1, further comprising ranking using a rank calculation based on at least one of a plurality of ranking factors including type of search word, location of the search word on a screen, number of times the search word is detected, and timing of when the screen linked to the search word was indexed.

6. The method of claim 1, wherein aggregating occurs when the emulator receives a screen from the host and when the emulator sends data to the host.

7. The method of claim 1, wherein aggregating occurs by intercepting and parsing screen based communication protocols.

8. The method of claim 1, wherein the field names assigned in the aggregating step belong to at least one of three categories: (i) Keyword, (ii) Screen, and (iii) EmulatorAction.

9. The method of claim 1, wherein the filtering of the search results is based on session identifiers, screen names, and field properties so as to provide role based access to search results.

10. A non-transitory computer readable medium comprising executable instructions for performing the method of claim 1.

11. A free text search engine system for an application comprising:
a processor configured to
aggregate information sent to and received from a host by an emulator running the application, the information including (i) field names and associated field contents for a display screen for the application, (ii) emulator action indicating sent or received, (iii) a screen image of the display screen used when the information was sent or received, and (iv) a hot link to reproduce the display screen;

index the field contents and the field names in a memory;

search responsive to receipt of a search query specifying a search term, the field contents and the field names in the memory that match the search term to form search results; and return the search results by providing the screen image of the display screen used when the information matching the search term was sent or received and/or the hot link to navigate to a live copy of the display screen with the information that matches the search term.

12. The system of claim 11, wherein the processor is further configured to receive notification that the emulator running the application has either received data from the host or sent data to the host for the display screen for the application, and subsequently performing the aggregating of the data.

13. The system of claim 11, wherein the processor is further configured to navigate from the search results to the screen image returned in the search results.

14. The system of claim 11, wherein the processor is further configured to filter the search results.

15. The system of claim 11, wherein the processor is further configured to rank using a rank calculation based on at least one of a plurality of ranking factors including type of search word, location of the search word on a screen, number of times the search word is detected, and timing of when the screen linked to the search word was indexed.

16. The system of claim 11, wherein aggregating occurs when the emulator receives a screen from the host and when the emulator sends data to the host.

17. The system of claim 11, wherein aggregating occurs by intercepting and parsing screen based communication protocols.

18. The system of claim 11, wherein the field names assigned in the aggregating step belong to at least one of three categories: (i) Keyword, (ii) Screen, and (iii) EmulatorAction.

19. The system of claim 11, wherein the filtering of the search results is based on session identifiers, screen names, and field properties so as to provide role based access to search results.

* * * * *